(12) United States Patent
Boston et al.

(10) Patent No.: US 7,631,501 B2
(45) Date of Patent: Dec. 15, 2009

(54) PROFILED SEALING BODY WITH SPRING SECTION

(75) Inventors: Ian William Boston, Horgen (CH); Kenneth W. Cornett, Ivorytown, CT (US); Hans-Martin Hocke, Sedgefield (GB); Jonas Hurter, Baden (CH); Dominick Greg More, Middletown, CT (US)

(73) Assignee: Alstom Technology Ltd, Baden (CH)

( * ) Notice: Subject to any disclaimer, the term of this patent is extended or adjusted under 35 U.S.C. 154(b) by 503 days.

(21) Appl. No.: 11/067,722

(22) Filed: Mar. 1, 2005

(65) Prior Publication Data

US 2005/0235647 A1    Oct. 27, 2005

(30) Foreign Application Priority Data

Mar. 1, 2004    (DE) .................... 10 2004 010 422

(51) Int. Cl.
*F02C 1/00*    (2006.01)
*F02G 3/00*    (2006.01)

(52) U.S. Cl. ............................. 60/752; 60/735; 277/648

(58) Field of Classification Search ............... 60/752, 60/734–748, 796, 800; 239/398–434.5; 277/653, 277/648, 644
See application file for complete search history.

(56) References Cited

U.S. PATENT DOCUMENTS 3,759,038 A * 9/1973 Scalzo et al. ................. 60/800
4,712,370 A * 12/1987 MacGee ....................... 60/785
6,860,487 B2 * 3/2005 Shiokawa et al. ........... 277/607
6,869,082 B2 * 3/2005 Parker ......................... 277/630
6,880,341 B2 * 4/2005 Parkman et al. ............... 60/740
2005/0062237 A1 * 3/2005 Parker et al. ................ 277/654

* cited by examiner

*Primary Examiner*—Michael Cuff
*Assistant Examiner*—Andrew Nguyen
(74) *Attorney, Agent, or Firm*—Buchanan Ingersoll & Rooney PC (57) ABSTRACT

The present invention relates to a sealing body for sealing an outer component with respect to an inner component, in particular for a combustion chamber of a gas turbine. The outer component has a passage opening, through which the inner component projects out of the outer component. In the installed state, the sealing body is arranged in the region of the passage opening, surrounds the inner component in a circumferentially continuous manner, bears in a circumferentially continuous manner, by means of an inner sealing zone, against an outer sealing surface of the inner component and bears in a circumferentially continuous manner, by means of an outer sealing zone, against an inner sealing surface of the outer component. The sealing body is produced by deformation from at least one metal sheet that is in strip form and is circumferentially continuous. The inner sealing zone and the outer sealing zone are formed at a profiled section of the sealing body along the entire circumference.

13 Claims, 5 Drawing Sheets

PROFILED SEALING BODY WITH SPRING SECTION

FIELD OF THE INVENTION

The present invention relates to a sealing body for sealing an outer component with respect to an inner component, in particular for a combustion chamber of a gas turbine.

DISCUSSION OF BACKGROUND

In a gas turbine, a combustion chamber, in particular an annular combustion chamber or a silo combustion chamber, has at least one burner, in particular a premix burner. In particular embodiments of the combustion chamber, a burner of this type may be equipped with a lance which extends through a passage opening formed in a head of the burner and projects into the burner. A lance of this type serves to inject fuel into the burner or into the combustion chamber.

In the region of the abovementioned passage opening, the lance has to be sealed with respect to the burner in order to prevent the hot combustion exhaust gases from penetrating into a space upstream of the burner. A seal of this nature must be sufficiently elastic to enable it to cope with the relative movements between lance and burner that occur when the combustion chamber is operating. These movements are firstly vibrations which occur while the combustion chamber is operating and secondly extreme thermal expansion or contraction effects which occur when the combustion chamber or gas turbine is being run up and shut down. Finally, the seal has to be able to withstand the high temperatures which occur in operation.

SUMMARY OF THE INVENTION

This is where the invention comes in. The invention as characterized in the claims deals with the problem of demonstrating a particularly effective way of sealing an outer component with respect to an inner component which ensures sufficient functional ability in particular at high temperatures, with extensive thermal expansion effects and with high levels of vibrations.

According to the invention, this problem is solved by the subject matter of the independent claims. Advantageous embodiments form the subject matter of the dependent claims.

The invention is based on the general concept of arranging, in the region of the passage opening, a sealing body which surrounds the inner component in a circumferentially continuous manner, bears in a circumferentially continuous manner, by means of an inner sealing zone, against an outer sealing surface of the inner component and bears in a circumferentially continuous manner, by means of an outer sealing zone, against an inner sealing surface of the outer component. The sealing body is produced by deformation at least from one metal sheet that is in strip form and is continuous circumferentially. This deformation is carried out in such a way that the sealing body acquires a profiled section which includes the sealing zones. The use of a metal sheet for producing the sealing body makes the latter able to withstand high temperatures, enabling it to cope with, for example, the temperatures that occur when a burner is operating. Since the metal sheet from which the sealing body is formed is circumferentially continuous, the sealing body can also be exposed to relatively high loads and stresses without failing. The use of a metal sheet in strip form for producing the sealing body allows the inner sealing zone and the outer sealing zone to be spaced apart from one another in the profiled section, with the result that a flexural elasticity can be realized at the sealing body between its sealing zones, enabling the sealing zones, in the installed state, to be brought to bear with prestress against the associated sealing surfaces. Furthermore, the flexural elasticity ensures that the sealing body is able to function correctly in the event of vibrations and relative movements between the components which are to be sealed with respect to one another, since the sealing zones of the sealing body can follow changes in the relative positions of the sealing surfaces, on account of the elasticity of the sealing body.

An embodiment in which the sealing body is produced by deformation from two congruent metal parts that are in strip form and a circumferentially continuous is particularly advantageous; these metal sheets are arranged one inside the other and bear tightly against one another, with the inner sealing zone then being formed at the inner metal sheet and the outer sealing zone being formed at the outer metal sheet. This doubling-up of material enables the flexural strength and therefore the prestresses that can be attained to be increased considerably, while at the same time continuing to ensure that the sealing body can be produced by deformation. Since the metal sheets used for this purpose are congruent and, after the deformation operation, have virtually the same profile, the two metal sheets in the sealing body are joined together by a positive lock and are thereby securely connected to one another. The deformation operation may in this context readily be carried out in such a way that the two metal sheets then bear against one another with a high pressure, in order thereby to achieve the desired sealing between the individual metal sheets. In principle, however, it is possible for the two metal sheets additionally to be soldered and/or welded to one another. In this context, it is fundamentally possible for the inner metal sheet and outer metal sheet to be configured differently in terms of material and/or wall thickness. This provides the option of adapting the inner metal sheet and outer metal sheet with a view to performing different functions and satisfying different requirements. By way of example, the inner metal sheet may be designed to provide required mechanical properties for the sealing body, such as for example strength, elasticity and dimensional stability, whereas, by contrast, the outer metal sheet can be designed to deal with high thermal and chemical loads on the sealing body, so that the outer metal sheet, as it were, acts as a protective layer.

According to one specific refinement, the sealing body may have at least one curved circumferential section in which the inner metal sheet and/or the outer metal sheet has/have a plurality of slots that run transversely with respect to the circumferential direction and penetrate all the way through the respective metal sheet. Forming slots in the curved circumferential sections simplifies production of the curved circumferential sections by deformation. Furthermore, the sealing body, by virtue of the slots in the curved circumferential sections, acquires an increased elasticity, which improves resilient yielding of the sealing body in these circumferential regions.

If both the inner metal sheet and the outer metal sheet are provided with the slots, it is possible, in one refinement, for the slots in the inner metal sheet to be arranged circumferentially offset with respect to the slots in the outer metal sheet, so that the metal sheets bear tightly against one another between circumferentially adjacent slots. With an embodiment of this type, both the inner metal sheet and the outer metal sheet, in the respective curved circumferential section, have the improved production properties and flexural elasticity, with the sealed bearing between inner metal sheet and outer metal sheet also being ensured by the special offset arrangement of the inner and outer slots.

According to another advantageous embodiment, the profiled section may present a spring section which yields resiliently inward and presses the outer sealing zone onto the inner sealing surface in the installed state. Equipping the profiled section with a special spring section makes it possible to set a desired resilience and yielding property in order to allow reversible predetermined changes in relative position between the sealing zones of the sealing body. The sealing action of the sealing body can therefore be ensured even over a relatively wide range of relative movements between the components or between the sealing surfaces thereof.

Further important features and advantages of the sealing body according to the invention will emerge from the subclaims, from the drawings and from the associated description of figures on the basis of the drawings.

BRIEF DESCRIPTION OF THE DRAWINGS

Preferred exemplary embodiments of the invention are illustrated in the drawings and are explained in more detail in the description which follows, in which identical reference numerals in each case denote identical or similar or functionally equivalent components. In the drawings.

WAYS OF CARRYING OUT THE INVENTION

Figure 1:
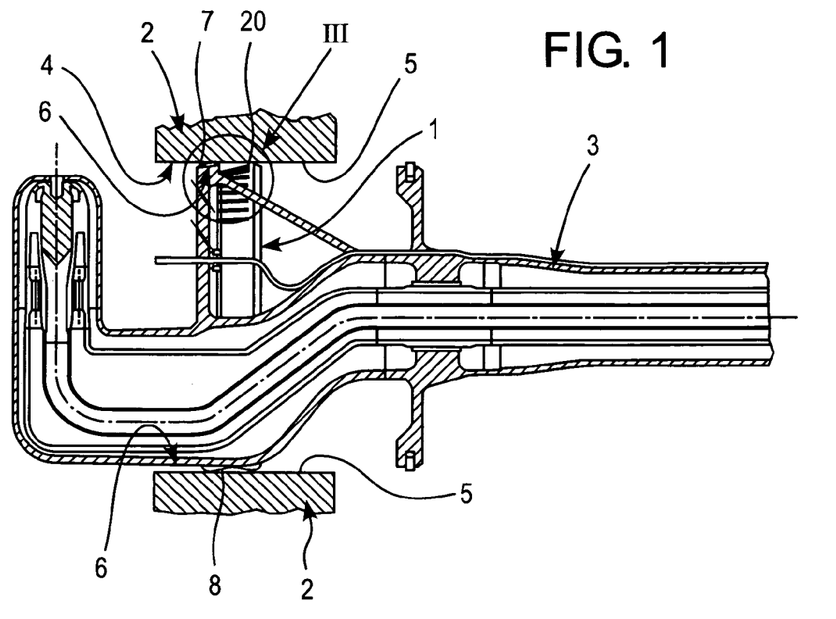
FIG. 1 diagrammatically depicts a longitudinal section through a region between two components which are sealed with respect to one another with the aid of the sealing body according to the invention, FIG. 2 diagrammatically depicts a perspective view of an excerpt from FIG. 1, FIG. 3 diagrammatically depicts an enlarged view of a detail III from FIG. 1, FIG. 4 diagrammatically depicts a perspective view of the sealing body, FIG. 5 diagrammatically depicts a side view of the sealing body, FIG. 6 diagrammatically depicts a front view of the sealing body, FIG. 7 diagrammatically depicts a plan view of the sealing body, FIG. 8 diagrammatically depicts an enlarged plan view of a detail VIII from FIG. 7, FIG. 9 diagrammatically depicts a longitudinal section through a profiled section of the sealing body corresponding to section lines IX in FIG. 7.
Figure 2:
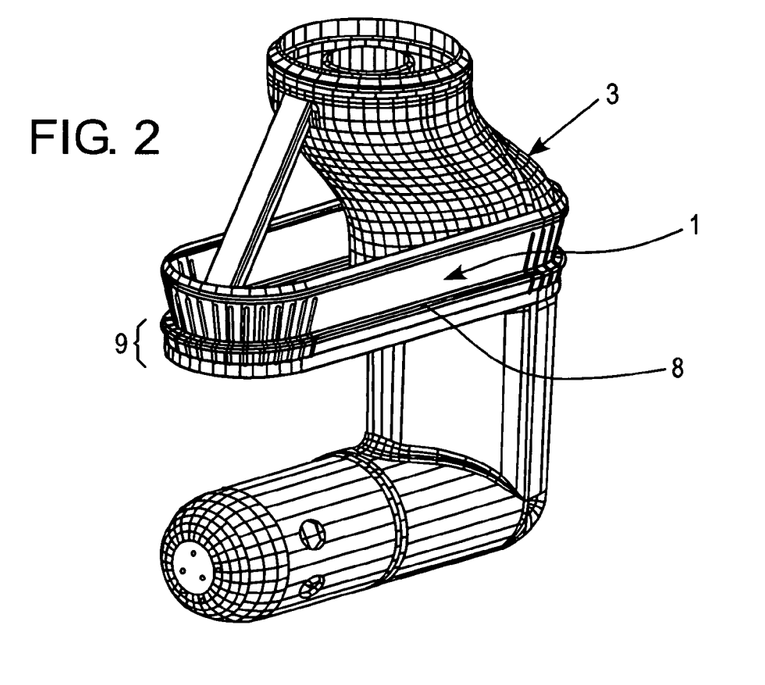

In accordance with FIG. 1, a sealing body 1 according to the invention is used to seal an outer component 2 with respect to an inner component 3, with the inner component 3 passing through a passage opening 4 in the outer component 2. In one preferred form of application of the sealing body 1 according to the invention, the outer body 2 is a burner (which is only partially illustrated here) of a combustion chamber (which is not otherwise illustrated) of a gas turbine. In the preferred form of application, the inner component 3 is a lance which projects through the passage opening 4 or out of that section of the burner or of the outer component 2 which includes the passage opening 4. The lance, i.e. the inner component 3, when the combustion chamber is operating, is used to inject or spray fuel into the burner or the combustion chamber. The passage opening 4 is in this case formed at a head of the corresponding burner, from which the lance projects into the burner.

Figure 3:
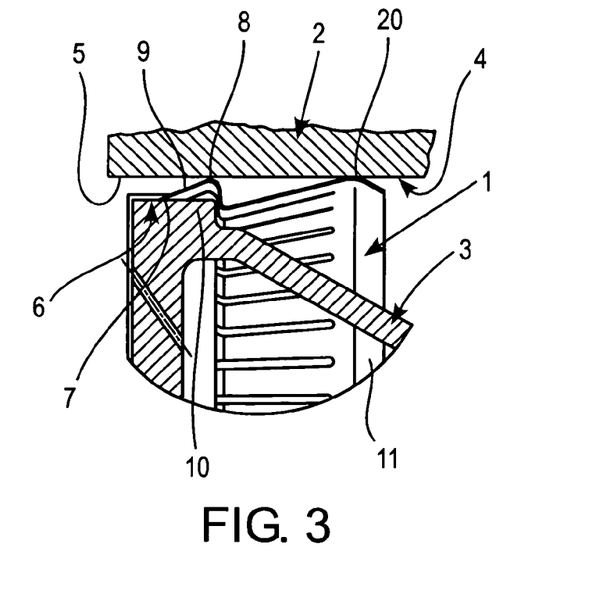
Figure 4:
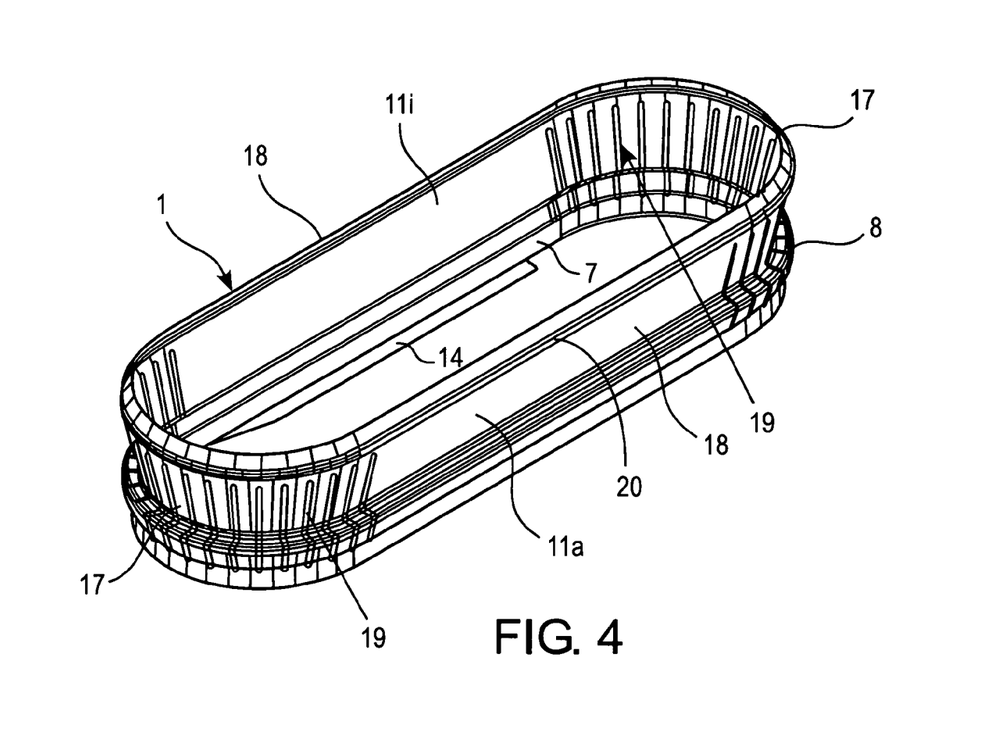
Figure 5:
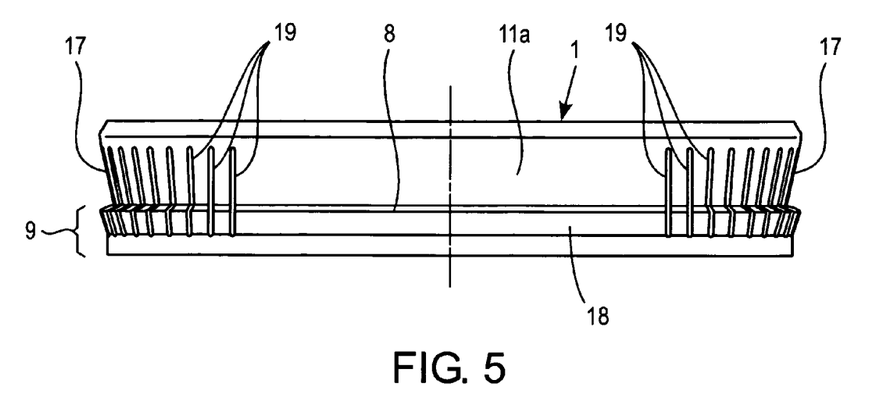
Figure 6:
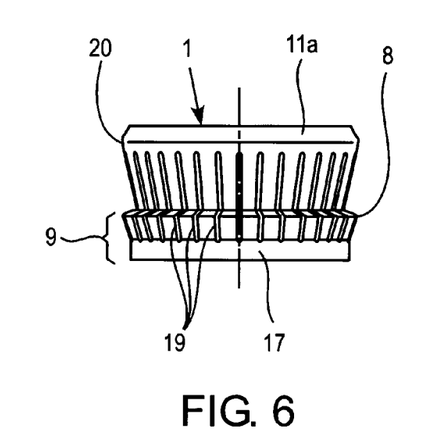
Figure 7:
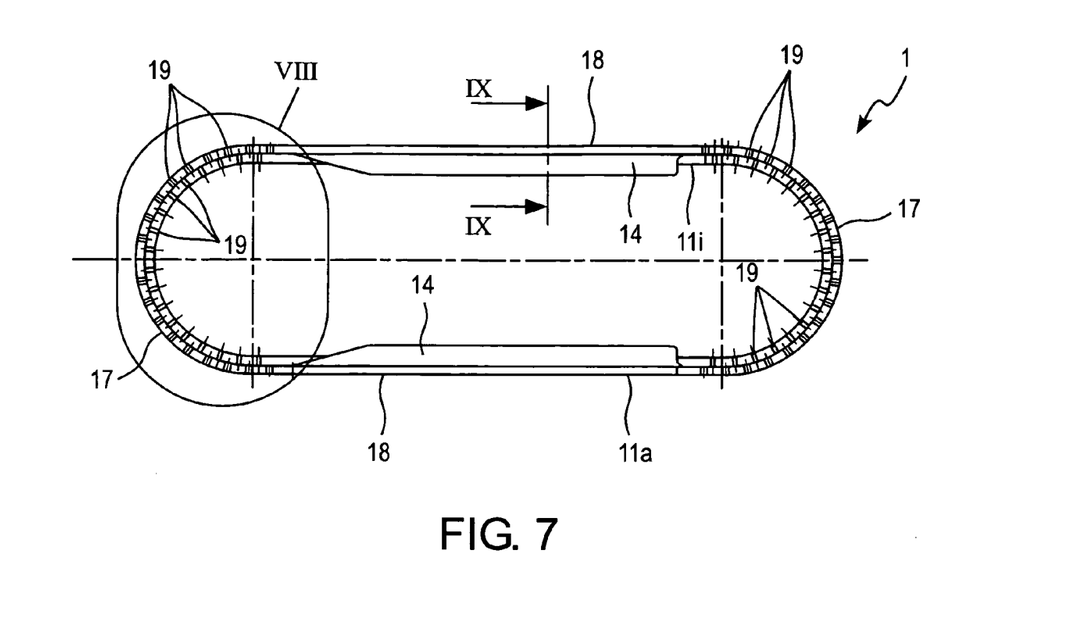
Figure 8:
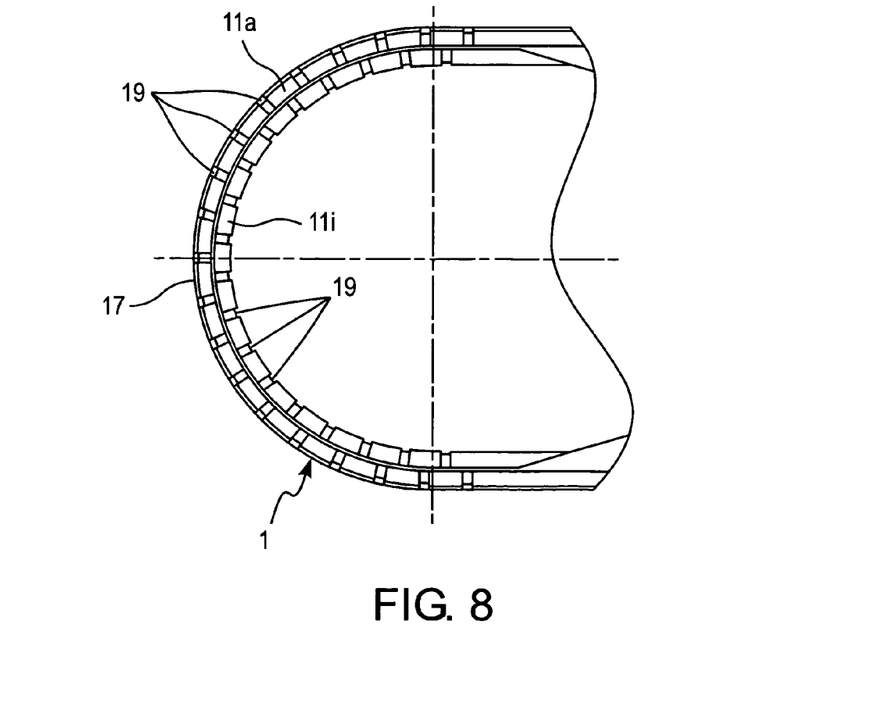

In the region of the passage opening 4, the outer component 2 has an inner sealing surface 5 which faces the inner component 3. By contrast, in the region of the passage opening 4 the inner component 3 is equipped with an outer sealing surface 6 which faces the outer component 2, c.f. in this respect also FIG. 3. The sealing body 1 is now configured in such a way that it has an inner sealing zone 7 and an outer sealing zone 8. In the installed state shown in FIG. 1, the sealing body 1 is arranged in the region of the passage opening 4, specifically in such a way that it surrounds the inner component 3 in a circumferentially continuous manner. Furthermore, the inner sealing zone 7 bears against the outer sealing surface 6 in a circumferentially continuous manner. At the same time, the outer sealing zone 8 bears against the inner sealing surface 5 in a circumferentially continuous manner. Furthermore, at the sealing body 1 there is formed a holding zone 9 which interacts with a complementary holding region 10 formed on the inner component 3 and thereby fixes the sealing body 1 on the inner component 3, c.f. in this respect FIG. 3. Both the inner sealing zone 7 and the outer sealing zone 8 are formed in the holding zone 9.

The sealing body 1 can expediently be fixed in a self-retaining manner on the inner component 3. In accordance with FIG. 3, the sealing body 1 can be prefitted to the inner component 3 in this way. The inner component 3, together with the sealing body 1 secured to it, can then be fitted to the outer component 2, in particular inserted into the passage opening 4.

The sealing body 1 has a circumferential contour which is of complementary form to an inner contour of the passage opening 4. As can be seen particularly clearly from FIGS. 2 and 4 to 7, the circumferential contour of the sealing body 1 may be in the shape of an elongated circle, i.e. may be of a shape which comprises two semi-circles which are at a distance from one another and are connected to one another by two parallel connecting sections. A circumferential contour of the sealing body 1 of this nature, and the complementary inner contour of the passage opening 4 may, for example, be produced by the angled-off shape of the lance (inner component 3) shown here, in order to allow the free end of the lance to be fitted through the passage opening 4. In other embodiments, in particular with different lances, it is also possible to provide elliptical or circular contours for the passage opening 4 and therefore for the circumference of the sealing body 1.

According to the invention, the sealing body 1 is produced by deformation from at least one metal sheet 11 that is in strip form and is circumferentially continuous. By way of example, the sealing body 1 is produced from a cylindrical, sleeve-like sheet-metal body which is circumferentially continuous. The deformation is expediently performed by means of a suitable rolling process. Casting processes are ruled out on account of the desired elasticity and strength properties. The desired profiling means that the sealing body 1 also cannot be deep-drawn. By contrast, the sealing body 1 may, as an alternative to roll-forming, also be produced by means of hydroforming.

Figure 9:
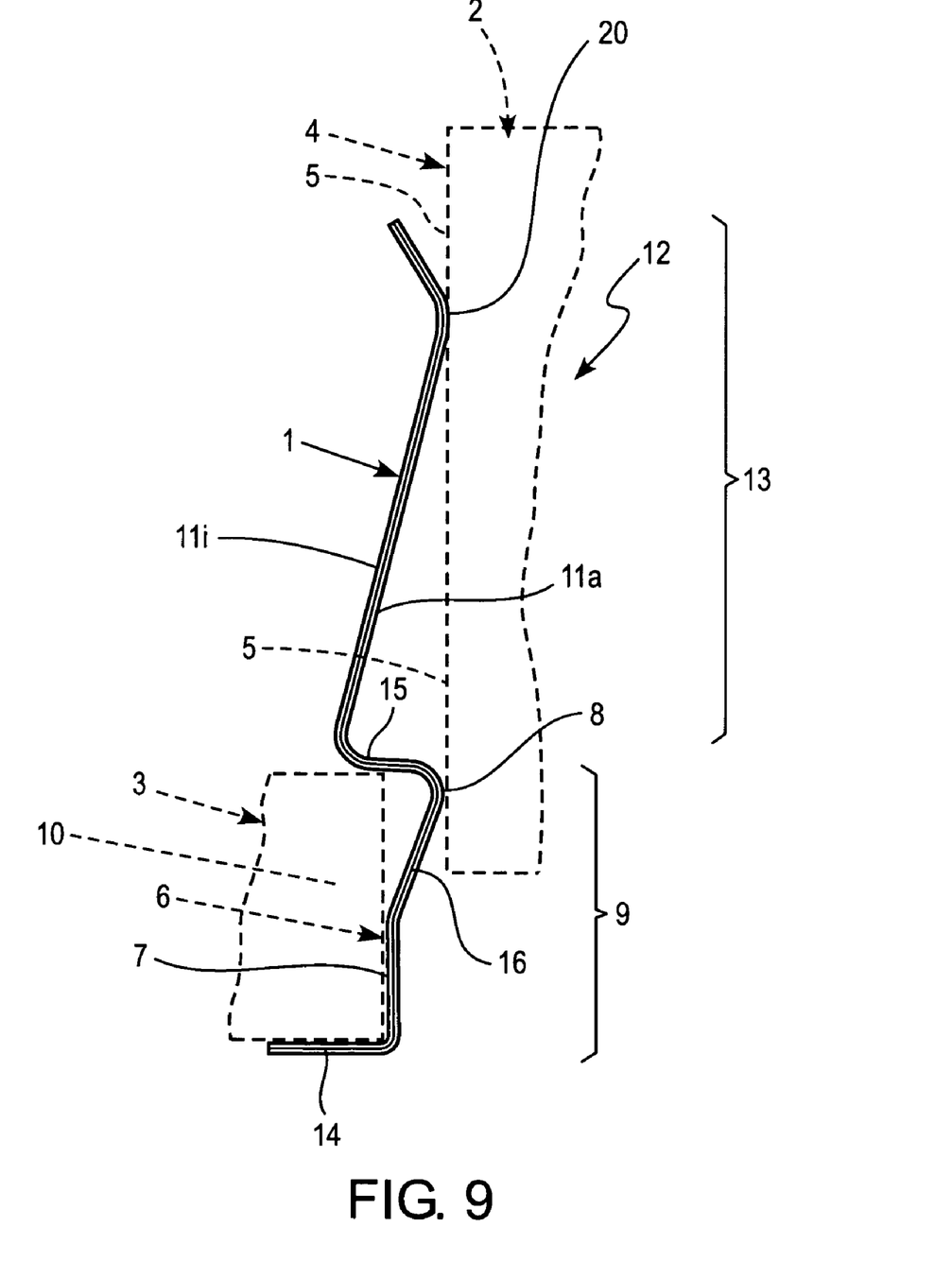

In accordance with FIG. 9, the sealing body 1 acquires a profiled section 12 as a result of the corresponding deformation operation. This profiled section 12 is shaped in such a way that it includes or forms the inner sealing zone 7 and, at a distance therefrom, the outer sealing zone 8 along the entire circumference of the sealing body 1. Furthermore, at least in one circumferential section of the sealing body 1, the holding zone 9 is formed at the profiled section 12, this holding zone being indicated in FIG. 9 by a curly bracket. The outer sealing zone 8 is formed in the profiled section 12 by a curvature which is outwardly convex, i.e. is convex toward the inner sealing surface 5 of the outer component 2. On account of this configuration, in the installed state the outer sealing zone 8 bears linearly against the inner sealing surface 5. A corresponding shaping of the inner sealing surface 5 permits relative movements in the insertion direction between the components 2 and 3, which the outer sealing zone 8 can readily follow, ensuring a sufficient sealing action over the entire adjustment range. By way of example, the outer component 2 is provided with a cylindrical, in particular circular-cylindrical, inner sealing surface 5.

In the preferred embodiment shown here, the profiled section 12 is equipped with a spring section 13 which is indicated by a curly bracket in FIG. 9. This spring section 13 at least yields resiliently inward and, at a distance from the inner sealing zone 7, has a supporting zone 20. This design, given a corresponding dimensioning of the sealing body 1, makes it possible to ensure that the outer sealing zone 8, in the installed state, at least in a starting position bears against the inner sealing surface 5 under a prestress, i.e. is pressed onto the inner sealing surface 5. In this case, the spring section 13 is expediently likewise supported, via the supporting zone 20, against the inner sealing surface 5. The resilience of the spring section 13 and the prestress with which the outer sealing zone 8 bears against the inner sealing surface 5 ensure, in the event of relative movements between the components 2, 3 perpendicular to the inner sealing surface 5, that the outer sealing zone 8 elastically follows and yields without losing contact with the inner sealing surface 5. Consequently, sealed bearing of the outer sealing zone 8 against the inner sealing surface can be ensured in the event of the abovementioned relative movements.

By contrast, in the embodiment shown here, the inner sealing zone 7 in the profiled section 12 is rectilinear in form, with the result that, in the installed state, it bears areally against the outer sealing surface 6. Areal contact of this nature allows a particularly high sealing action to be produced.

As can be seen from the section in FIG. 9, the holding zone 9 in the profiled section may be formed as a C-shaped clip. This clip (holding zone 9) has two holding sections 14, 15 which are angled off inward, lie opposite one another and, in the installed state, engage around the holding region 10 of the inner component 3 on two opposite sides. For this purpose, the holding region 10 is designed as an outwardly protruding holding collar. It is preferable for the holding zone 9 between the two holding sections 14, 15 to be shaped in such a way that a spring 16 is formed. This spring 16 may firstly prestress the two holding sections 14, 15 toward one another or in the installed state may press them onto the holding collar (holding region 10). This results in play-free fixing of the sealing body 1 against the second component 3. At the same time, this makes it possible to compensate for manufacturing tolerances in the insertion direction. Secondly, moreover, the spring 16 allows the inner sealing zone 7 to bear in a prestressed manner against the outer sealing surface 6, with corresponding matching of the dimensions of the sealing body 1 to the dimensions of the outer sealing surface 6. At the same time, this also makes it possible to compensate for tolerances occurring transversely with respect to the insertion direction.

The spring section 13 may, for example, be dimensioned in such a way that a distance between the supporting zone 20 and the sealing zones 7 and 8 amounts to between a radius of curvature of the circumferential sections 17 which are curved in the shape of a semicircle and a distance between the rectilinear circumferential sections 18.

It is expedient for one of the holding sections 14, 15, in this case the holding section denoted by 14, to be formed at a free end of the profiled section 12 and to be angled off inward. As can be seen in particular from FIG. 7, the circumferential contour of the sealing body 1 has two circumferential sections 17 which are curved in the shape of a semicircle and two rectilinear circumferential sections 18 which run parallel to one another and connect the two curved, semicircular circumferential sections 17 to one another. In the embodiment shown here, the holding section 14 formed at the free end of the profiled section 12 is formed exclusively at the two rectilinear circumferential sections 18, with the result that the holding zone 9 or the clip is also formed on the profiled section 12 only in the region of these rectilinear circumferential sections 18. The reasons for this are in particular related to manufacturing technology, since it is impossible or at least very difficult to produce a holding section 14 which is angled off inward on the curved circumferential sections 17.

It will be clear that the holding section 9 may in principle also be configured in such a way that the sealing body 1 can therefore be fixed in a self-retaining manner on the outer component 2.

Depending on the particular application, the sealing body 1, in operation, may be subject to very high forces and/or moments. To enable these loads to be elastically absorbed, the sealing body 1 requires a relatively high spring strength. The radii of curvature than can be achieved by deformation, however, depend on the material thickness of the metal sheet 11 used. Thicker metal sheet 11 limits how small the radii of curvature can be. In order now to achieve a greater spring strength for relatively small radii of curvature, in a preferred embodiment of the sealing body 1 according to the invention it is proposed for the sealing body to be produced by deformation from two metal sheets 11$i$ and 11$a$, with these two metal sheets 11$i$, 11$a$ being arranged congruently and in each case being circumferentially continuous and in strip form. Furthermore, these metal sheets 11$i$, 11$a$ are arranged one inside the other and bear tightly against one another. Consequently, the inner sealing zone 7 is formed on the internally located metal sheet or inner metal sheet 11$i$, and the outer sealing zone 8 is formed on the externally located metal sheet or outer metal sheet 11$a$. The two metal sheets 11$i$, 11$a$ produce a two-layer composite structure for the sealing body 1. The two metal sheets 11$i$, 11$a$ can move relative to one another during the deformation used to produce the sealing body 1, which is of benefit to the production of smaller radii of curvature. At the same time, they form doubled-up material, so that they are reinforced with respect to one another, thereby producing an increased spring strength.

As can be seen in particular from FIG. 9, the two metal sheets 11$i$ and 11$a$ extend congruently over the entire length of the profiled section 12. On account of the profiling selected, this results in an intensive positive lock between the two metal sheets 11$i$, 11$a$, with the result that the two metal sheets 11$i$, 11$a$ are fixedly connected to one another without additional securing measures being required. Nevertheless, the option of using additional securing measures, such as for example soldering and/or welding, is not ruled out.

The formation of curved circumferential sections 17 on the sealing body 1 is on the one hand imperative, since the sealing body 1 must completely surround the circumference of the internally located component 3. Furthermore, the curvature, in combination with the selected profiling, reduces the elasticity of the profile 12 in these curved circumferential sections 17. However, since the sealing body 1 is also supposed to respond elastically to relative movements between components 2, 3 in its curved circumferential sections 17 while at the same time retaining its sealing action, it is desirable to increase the elasticity in the region of the curved circumferential sections 17. This is achieved in the sealing body 1 according to the invention with the aid of slots 19 which are formed in the respective curved circumferential section 17, run transversely with respect to the circumferential direction and penetrate all the way through the respective metal sheet 11*i*, 11*a*. These slots extend as far as directly onto or just in front of the sealing zones 7 and 8 of the sealing body 1. The slots 19 are formed during production of the sealing body 1 prior to the deformation of the metal sheet 11 in question.

In the preferred embodiment shown here, both the inner metal sheet 11*i* and the outer metal sheet 11*a* are equipped with the slots 19. In other embodiments, only the inner metal sheet 11*i* or only the outer metal sheet 11*a* may be equipped with the slots 19. The slots 19 in the curved circumferential sections 17 as it were segment the corresponding metal sheet 11, with the result that the elasticity of the sealing body 1 is considerably increased in this curved circumferential section 17. This means that in curved circumferential sections 17 the sealing body 1 can yield resiliently over considerably larger deformation distances.

In the embodiment shown here, both the inner metal sheet 11*i* and the outer metal sheet 11*a* are provided with the the slots 19 in the curved circumferential sections 17. As can be seen in particular from FIG. 9, the slots 19 are positioned in such a way at the metal sheets 11*i*, 11*a*, or the inner metal sheet 11*i* and outer metal sheet 11*a* are positioned in such a way relative to one another, that the slots 19 in the inner metal sheet 11*i* are arranged circumferentially offset with respect to the slots 19 in the outer metal sheet 11*a*. By way of example, the slots 19 in the inner metal sheet 11*i* are in each case arranged centrally between two slots 19 in the outer metal sheet 11*a*. At any rate, each slot 19 in the outer metal sheet 11*a* is covered by a wall segment located between adjacent slots 19 in the inner metal sheet 9*i*. In a corresponding way, each slot 19 in the inner metal sheet 11*i* is also covered by a wall segment located between adjacent slots 19 in the outer metal sheet 11*a*. This results in a configuration in which the metal sheets 11*i*, 11*a* bear tightly against one another between circumferentially adjacent slots.

What is important in this context is that the slots 19 are formed exclusively in the curved circumferential sections 17 and not in the rectilinear circumferential sections 18.

The metal sheet 11 which is in each case used to produce the sealing body 1, in particular the inner metal sheet 11*i* and the outer metal sheet 11*a*, is preferably produced integrally from a single piece. This provides the sealing body 1 with a particularly high strength.

It is preferable to use an embodiment in which the inner metal sheet 11*i* and the outer metal sheet 11*a* are adapted to perform different functions. By way of example, the inner metal sheet 11*i* serves to provide the sealing body 1 with the required mechanical stability, strength, rigidity and/or elasticity. By contrast, the outer metal sheet 11*a* can serve, as it were, as a protective layer and may for this purpose have an increased thermal and/or chemical resistance. Adapting the inner metal sheet 11*i* and the outer metal sheet 11*a* to perform different functions is achieved in particular by using different materials and/or different wall thicknesses for the inner metal sheet 11*i*, on the one hand, and the outer metal sheet 11*a*, on the other hand. Consequently, the inner metal sheet 11*i* can be optimized with a view to satisfying strength and elasticity requirements, while the outer metal sheet 11*a* may be optimized with a view to satisfying wear and oxidation requirements.

LIST OF DESIGNATIONS

1 Sealing body
2 Outer component
3 Inner component
4 Passage opening
5 Inner sealing surface
6 Outer sealing surface
7 Inner sealing zone
8 Outer sealing zone
9 Holding zone
10 Holding region
11 Metal sheet
11*i* Inner metal sheet
11*a* Outer metal sheet
12 Profiled section
13 Spring section
14 Holding section
15 Holding section
16 Spring
17 Curved circumferential section
18 Rectilinear circumferential section
19 Slot
20 Supporting zone

The invention claimed is:

1. A gas turbine combustor comprising a sealing body for sealing an outer component with respect to an inner component, the outer component having a passage opening, through which the inner component projects out of the outer component, the outer component comprises a burner of a combustion chamber of the gas turbine, with the passage opening being formed at a head of the burner, and the inner component comprises a lance which projects from the burner head into the burner to introduce fuel into the burner and/or into the combustion chamber;

the sealing body, in the installed state, being arranged in the region of the passage opening, surrounding the inner component in a circumferentially continuous manner, and bearing in a circumferentially continuous manner, by means of an inner sealing zone, against an outer sealing surface of the inner component and also bearing in a circumferentially continuous manner, by means of an outer sealing zone, against an inner sealing surface of the outer component, and the sealing body being produced by deformation from at least one metal sheet that is in strip form and is circumferentially continuous, wherein the inner sealing zone and the outer sealing zone being formed at a profiled section of the sealing body along the entire circumference, the profiled section has a spring section which yields resiliently inward and presses the outer sealing zone onto the inner sealing surface in the installed state, the spring section comprises a supporting zone bearing against the inner sealing surface of the outer component and is supported via said supporting zone against the inner sealing surface, the inner sealing zone and the outer sealing zone are formed in a holding zone, wherein the sealing body is fixed in a self-retaining manner, by means of the holding zone against a holding region of the inner component, the holding zone being formed on the profiled section at least in a circumferential section as a C-shaped clip which has two holding sections which are angled off inward, lie opposite on another and, in the installed state, engage around the holding region which is formed as an outwardly protruding holding collar.

2. The gas turbine combustor as claimed in claim 1, wherein the sealing body is produced by deformation from two congruent metal sheets that are in strip form and are circumferentially continuous, the metal sheets being arranged one inside the other and bearing tightly against one another, with the inner sealing zone being formed at the inner metal sheet and the outer sealing zone being formed at the outer metal sheet.

3. The gas turbine combustor as claimed in claim 2, wherein the inner metal sheet and outer metal sheet differ from one another in terms of material and/or wall thickness.

4. The gas turbine combustor as claimed in claim 2, wherein the sealing body has at least one curved circumferential section in which the inner metal sheet and/or the outer metal sheet has/have a plurality of slots that run transversely with respect to the circumferential direction and penetrate all the way through the respective metal sheet.

5. The gas turbine combustor as claimed in claim 4, wherein the slots in the inner metal sheet are arranged circumferentially offset with respect to the slots in the outer metal sheet, so that the metal sheets bear tightly against one another between circumferentially adjacent slots.

6. The gas turbine combustor as claimed in claim 1, wherein the outer sealing zone in the profiled section is curved in such a way that in the installed state it bears linearly against the inner sealing surface.

7. The gas turbine combustor as claimed in claim 1, wherein the inner sealing zone in the profiled section is rectilinear and in the installed state bears areally against the outer sealing surface.

8. The gas turbine combustor as claimed in claim 1, wherein the holding zone between the holding sections is formed as a spring which, in the installed state, presses the holding sections toward one another and onto the holding region.

9. The gas turbine combustor as claimed in claim 1, wherein the holding zone is formed in a rectilinear circumferential section of the sealing body.

10. The gas turbine combustor as claimed in claim 1, wherein the sealing body has a circular or elliptical or elongate-circular circumferential contour.

11. The gas turbine combustor as claimed in claim 1, wherein the sealing body is produced by roll-forming from the at least one metal sheet.

12. The gas turbine combustor as claimed in claim 1, wherein the sealing zone is arranged spaced apart from the inner sealing zone.

13. The gas turbine combustor as claimed in claim 1, wherein the sealing zone is arranged spaced apart from the outer sealing zone.

* * * * *